Nov. 22, 1966  R. J. PURTELL  3,286,723
IRRIGATION SYSTEM
Filed July 29, 1964  4 Sheets-Sheet 1
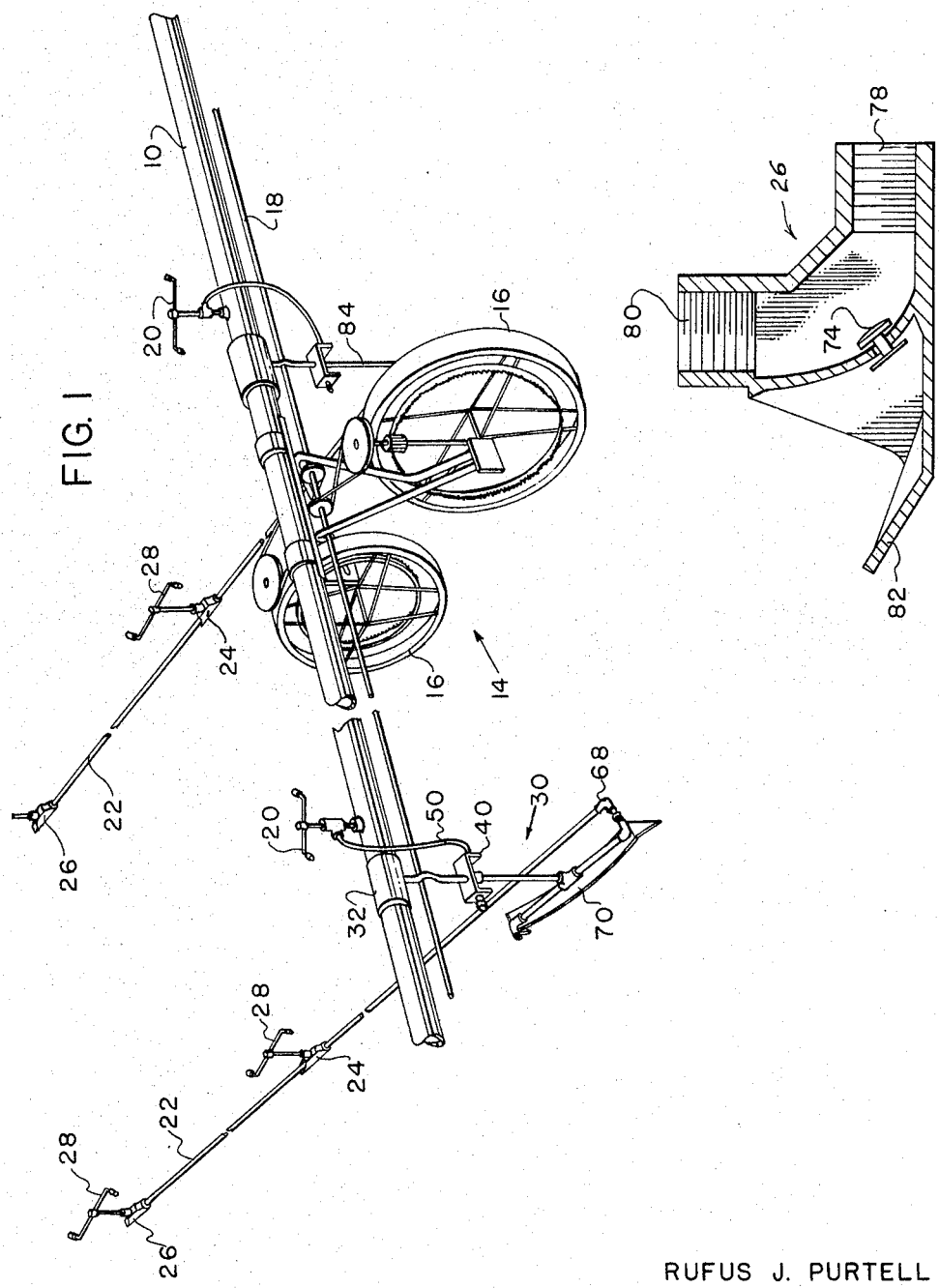
RUFUS J. PURTELL
INVENTOR.
BY:

Nov. 22, 1966  R. J. PURTELL  3,286,723
IRRIGATION SYSTEM

Filed July 29, 1964  4 Sheets-Sheet 2

RUFUS J. PURTELL
INVENTOR.

BY:

RUFUS J. PURTELL
INVENTOR.

RUFUS J. PURTELL
INVENTOR.

United States Patent Office 3,286,723
Patented Nov. 22, 1966

3,286,723
IRRIGATION SYSTEM
Rufus J. Purtell, Brownfield, Tex., assignor, by mesne assignments, to The J. B. Knight Co., Inc., Brownfield, Tex., a corporation of Texas
Filed July 29, 1964, Ser. No. 385,942
8 Claims. (Cl. 137—344)

This invention relates to an agricultural irrigation system and more particularly to a system for moving a sprinkler pipe and trail tubes across a field to be irrigated.

Under Rule 78, reference is made to my following patent applications: Serial No. 264,507, filed March 12, 1963, now Patent No. 3,245,608; Serial No. 331,087, filed December 12, 1963, now Patent No. 3,230,969, and Serial No. 351,338, filed March 12, 1964.

The desirability of providing vehicles for a sprinkler irrigation pipe so that the pipe may be moved from one part of the field to be watered to another is known to the art. As shown in my prior patent applications, one half the vehicles may be eliminated by substituting a movable support therefor. This movable support drags behind the pipe as the pipe is being moved, but when the pipe comes to rest the pipe line as a whole is moved back and the pipe sets up on top of the movable support.

Also, as is shown by prior patents, it is desirable to trail tubes behind the main line, thereby having a plurality of sprinklers having more sprinklers sprinkling water upon the land to be irrigated.

An object of this invention is to combine the movable support and the connection from the main irrigation pipe to the trail tubes.

Another object is to insure that the movable supports will all be directly under the pipe when the pipe is backed up over the movable support.

Another object is to provide such a movable support with which the pipe line may be moved forward or backwards or (with the trail tubes disconnected) moved endwise.

A further object is to provide such a combination wherein the trail tubes are connected in such a manner that they do not tend to overturn the vehicles as they drag behind the vehicles when moving.

A further object is to provide such a combination wherein the trail tubes are connected in such a manner that any individual vehicle may be moved forward or backward a short distance for alignment with other vehicles without movement of the trail tubes.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced unskilled people to perform.

The specific nature of the invention as well as other objects, uses, and advantages thereof will clearly appear from the following description and from the accompanying drawing, the different views of which are not necessarily to the same scale, in which:

FIG. 1 is a perspective view of an embodiment of this invention.

FIG. 7 is a detail of a trail tube connector to be used in this invention.

Figure 2:
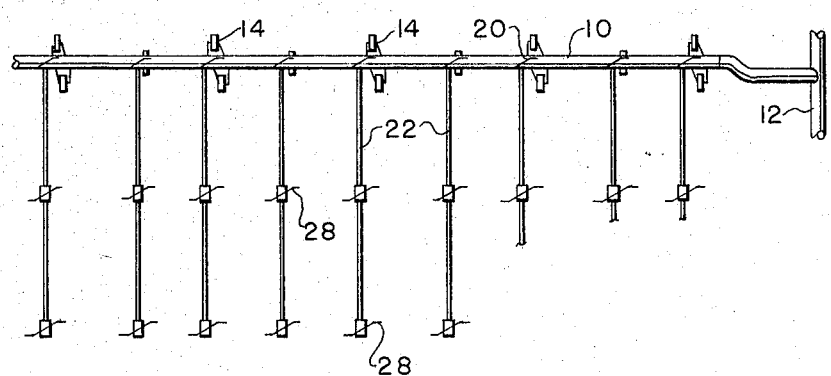
FIG. 2 is a plan view schematically representing an elongated pipe line with a plurality of trail tubes and vehicles attached thereto.

Referring particularly to FIGS. 1 and 2, it may be seen that elongated pipe 10 is adapted to be filled with water under pressure from a source of water under pressure 12, which in this case is itself a pipe line. The pipe 10 is supported by a plurality of vehicles 14. Each vehicle has two wheels 16 and is adapted to be driven normal to the pipe or aligned with the pipe 10 according to setting of the wheels 16. The vehicle and its operation is more particularly set out in prior patent applications, and will not be more particularly referred to here except it is noted that the wheels are driven by shaft 18 which is mounted in bearings below the pipe 10.

A plurality of sprinklers 20 are attached to the pipe 10 to sprinkle water upon the land to be watered. Also connected to the pipe by means more fully described later are a plurality of trail tubes 22 which have an intermediate connector 24 and back connector 26 by which additional sprinklers 28 are attached. Therefore, it may be seen that water may be sprinkled from a plurality of sprinklers.

Figure 3:
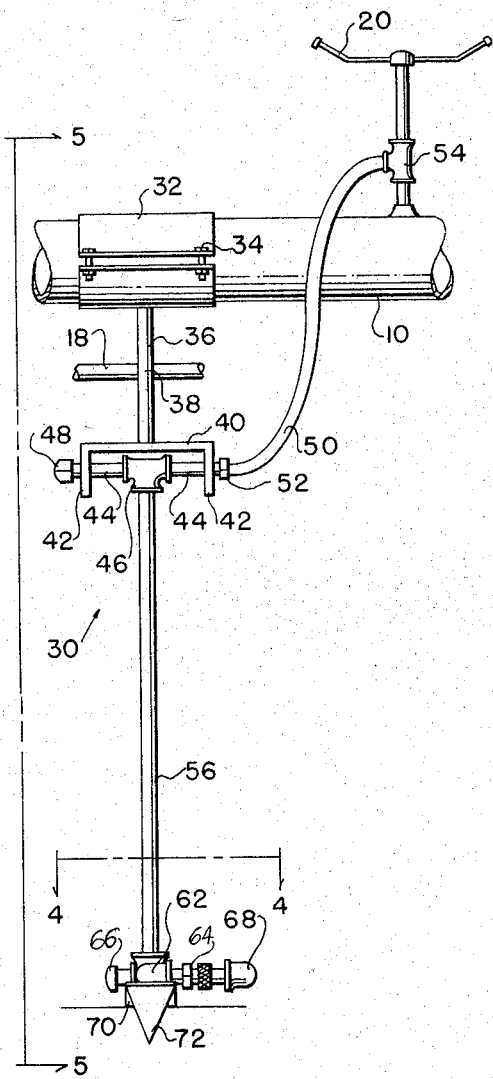
FIG. 3 is a front view of one movable support in the down or pipe supporting position.
Figure 5:
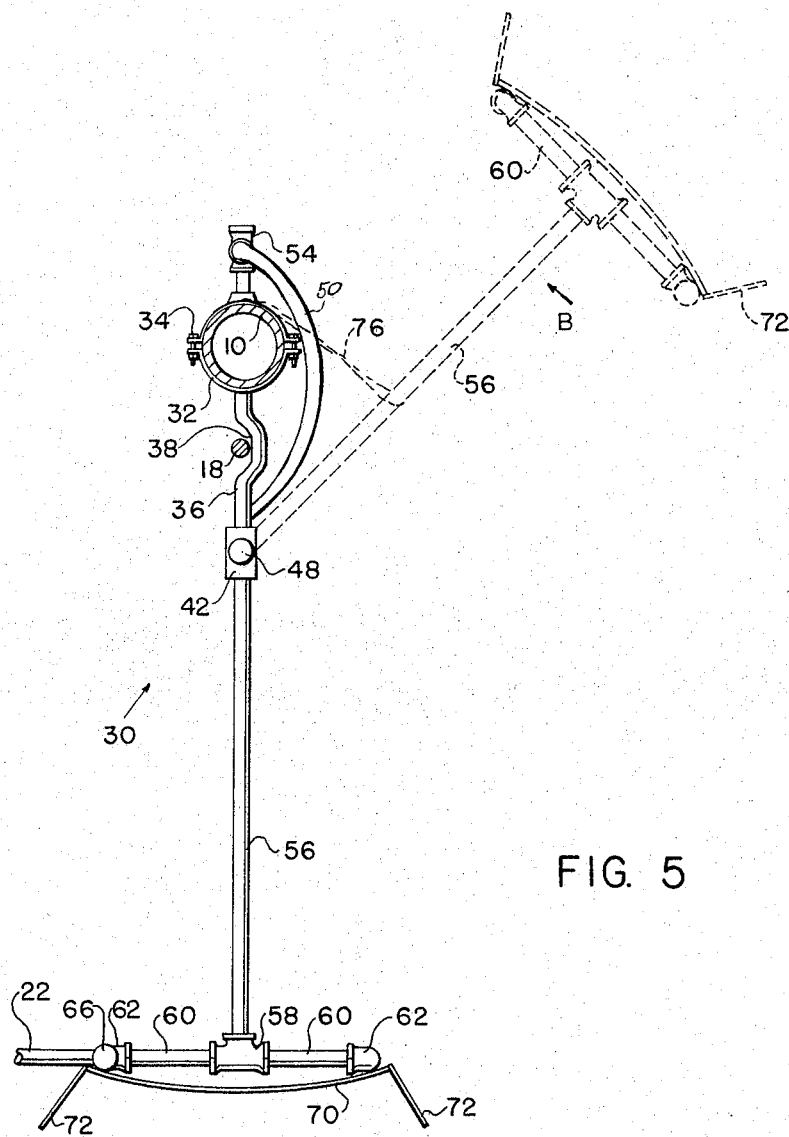
FIG. 5 is a side view showing the movable support in the lower position in full lines and in endwise moving positions in dotted lines with the pipe in section taken substantially on line 5—5 of FIG. 3.

Movable support 30 is attached to the pipe by band clamp 32. Referring particularly to FIGS. 3 and 5 it may be seen that the band clamp includes two hemicylindrical elements which have flanges thereon and by which bolts 34 are passed through to securely attach the clamp 32 to the pipe 10. Pendant 36 is welded or otherwise securely bonded to the bottom of clamp 32. In the preferred embodiment, pendant 36 has a bend at 38 so that the shaft 18 extends straight from one vehicle to the next. Bracket 40 is attached to the bottom of pendant 36. The bracket has a horizontal portion and two depending ears 42. Each of the ears are pierced so that pipe nipple 44 is journaled through the pierced ears 42. The two pipe nipples are connected structurally and in fluid relationship by pipe T 46. One nipple 44 is closed by cap 48. The other nipple has flexible rubber hose or tube 50 connected in fluid conducting relationship by adapter 52. The other end of the flexible tube 50 is connected to pipe T 54 which is in the riser by which the sprinkler 20 is connected to the pipe 10.

Thus a fluid path is provided from the source of water under pressure 12, through the pipe 10, the riser, T 54, flexible tube 50, adapter 52, nipple 44, to the T 46. Leg 56 in the form of a pipe is attached to one opening of the T 46 in fluid conducting relationship. The leg 56 is free to swing about the pierced ears 42, the nipples 44 forming a journal.

T 58 is mounted upon the bottom of leg 56 and a long nipple 60 is attached in either side of the T 58. Elbows 62 are attached to the end of the long nipples 60.

Figure 4:
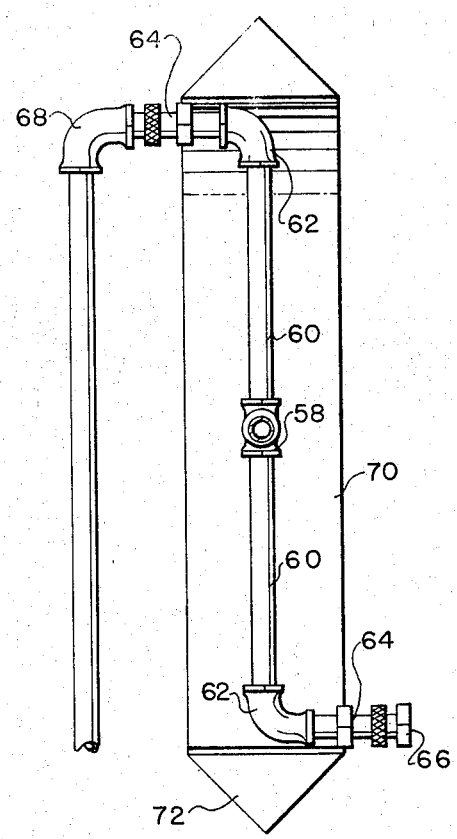
FIG. 4 is a sectional view showing the foot of the movable support taken on line 4—4 of FIG. 3.

As may be seen in the drawing, the alignment of the elements is such that the axis about which the leg 56 pivots is parallel to the pipe 10 and the shaft 18, i.e. the nipples 44 are aligned with pipe 10. The long nipples 60 extend at right angles to the pipe 10 and the nipples 44. Furthermore, the long nipples 60 with the elbows 62 form a skeleton for the foot. The elbows 62 are turned one to the right and one to the left as will be explained later. On the forward elbow 62 (forward being the direction of the movement of the vehicles 16) trail tube 22 is attached by a snap or quick coupling 64. The other nipple has a snap or quick coupling, but it is closed with a cap 66. The trail tube 22 has an elbow 68 of the quick coupling 64 so that the trail tube 22 extends behind or to the rear of the pipe 10 and right angles thereto. The trail tube 22 is parallel to the long nipples 60. The foot is shod with an arcuate sheet metal sole 70, attached by welding or otherwise bonded at each of the elbows 62 and forms a rocker therebetween as clearly seen in FIG. 5. The sole 70 is rectangular as may be seen in FIG. 4. A sharp pointed toe 72 extends from the front and from the rear of the foot at an angle thereto. The toe 72 is attached to the sole 70.

*Operation*

Figure 6:
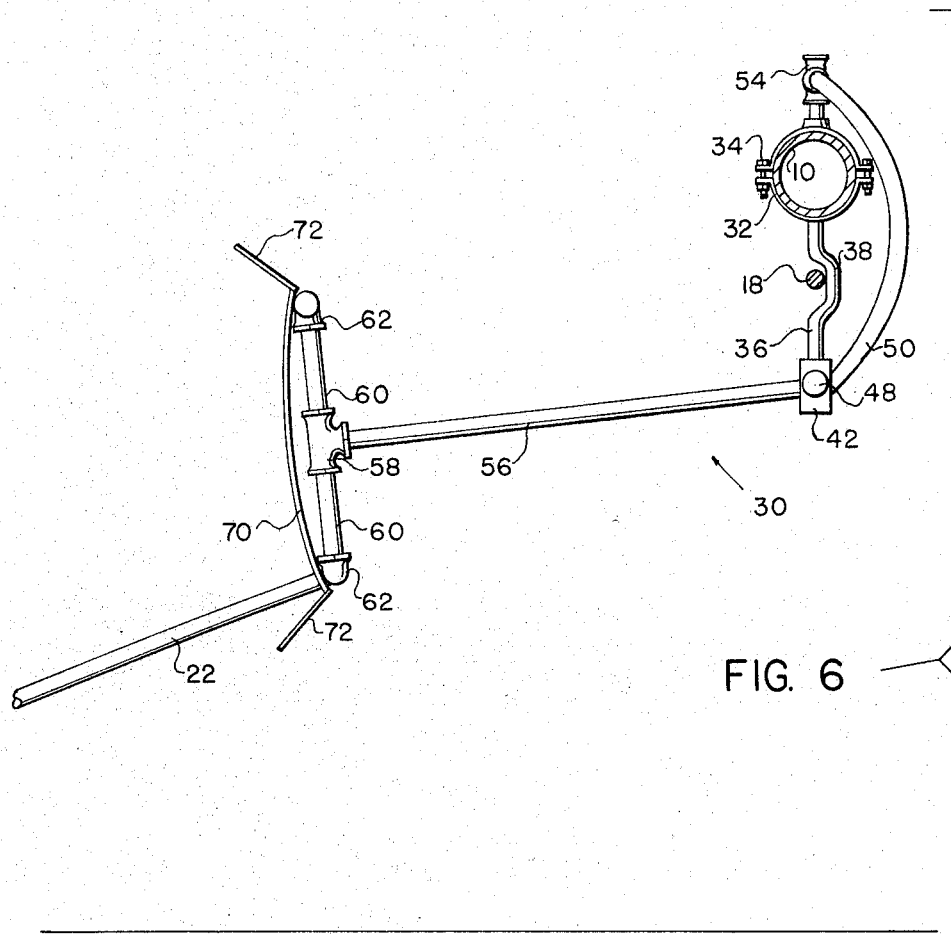
FIG. 6 is a side view similar to FIG. 5 showing the movable support in the position it is in while dragging the trail tubes.

Starting from a position where the system is in the field stationary and irrigating, the first step to move is to shut off the flow of water to the pipe 10 and disconnect it from the source 12. When the water is shut off, the water is drained by self-draining valve 74 in the connectors 24 and 26. Also these valves may be located in the pipe 10 to drain the pipe faster as is well known in the art. When the water is all drained from the pipe, the motor (not shown) is started upon the system and the shaft 18 rotated causing all the wheels 16 to rotate moving the system forward. As the system moves forward, the drag of the trail tubes 22 upon the ground will cause the leg 56 to trail behind the unit at an angle as shown in FIG. 6. The pendant 36 being below the pipe tends to prevent the drag from overturning the vehicles 14. The initial movement of the pipe 10 as it moves forward, causes the leg 56 to rotate at the nipples 44 so that the pipe 10 moves forward and the leg 56 rotates back to the position shown in FIG. 6. When the pipe 10 is moved to the desired position, it is advanced an additional short distance and then the shaft 18 reversed causing the system to reverse. The drag upon the trail tubes 22 prevents them from moving backwards causing the leg 56 to return to the solid line position of FIG. 5. When the toes 72 engage the ground, they form a positive stop preventing any possibility of the trail tubes 22 skidding backwards along the ground. The system is reversed until each of the legs 56 is vertical as seen in solid lines in FIG. 5 and then the move is complete. Pipe 10 is again connected to the source of supply under pressure 12 and the water turned on thus closing the automatic valve 74 and applying water to the field through the sprinklers 20 and 28.

If it is desired to move the system backwards (i.e. reverse the system and begin watering in the reverse direction) all that is necessary is to disconnect the trail tubes 22 by their quick coupling from the elbows 62. Then the pipe 10 is moved by the vehicles 14 to the desired position and the trail tubes 22 connected by their quick couplings 64 to the opposite elbow 62 previously having cap 66 thereon. Cap 66 is removed and put on the elbow 62 not in use. Therefore, it may be seen that the system may be quickly reversed to water in the opposite direction merely by removing and reconnecting the trail tubes 22.

If it is desired to move the system endwise, all that is necessary is to remove all the trail tubes 22 and transport them by some separate means of transportation. The legs 56 are rotated up as far as possible to the position as seen in dotted lines in FIG. 5 and strapped in that position by strap 76 which may be in the form of a chain. The wheels 16 are rotated so that they are aligned with the pipe 10 (as explained more fully in my prior patent application) and then the system moved endwise, either under its own power or by towing.

Referring more particularly to FIG. 7 for a representation of connector 26, it may be seen that these connectors are quite similar to those disclosed in my prior patent application. They have a water inlet 78, a water outlet 80 extending vertically upward to which is attached the riser to which the sprinkler 28 is attached. They have a flat bottom adapted to skid along the ground and an arcuate underside of larger radius than the inlet or outlet so that a valve 74 commercially available on the market, may be used. The valve 74 extends through a hole provided therefor. However, the distinction is that the heel 82 upon this connector 26 is angled up deviating about 30 degrees from the horizontal. Therefore, if by inadvertence the trail tube 22 is moved backwards, the valve 74 does not become fouled with debris. Furthermore, when the valve 74 opens and there is a gush of water exiting from the pipe 10 into the trail tubes 22, the uplifted heel 82 tends to divert the flow of water, reduce its velocity, and prevent it from washing the field.

Adjacent each vehicle 14 there is an additional trail tube 22 attached to the pipe 10 for watering. This attachment includes joint 84 which is pivoted to a pendant below the pipe and pivoted to the trail tube. By pivoting the joint 84 below the pipe, the drag of the trail tube does not tend to overturn the vehicles 14. By having a joint 84 between the pendant and the trail tube 22 the vehicle may be moved a short distance forward or backward for the purpose of alignment without moving the trail tube 22. Of course, it would be permissible to move the trail tube forward, but it is undesirable to move the trail tubes backwards as noted above.

It will be apparent that the embodiment shown is only exemplary and that various modifications can be made in construction, materials, and arrangement within the scope of the invention as defined in the appended claims.

I claim as my invention:

1. In an agricultural irrigation system having
   (a) an elongated pipe adapted to carry water under pressure,
   (b) a plurality of risers on the pipe adapted to carry sprinklers for sprinkling water onto land to be watered, and
   (c) a plurality of vehicles attached to the pipe movably supporting the pipe above the ground, the improvement comprising:
   (d) a movable support between adjacent vehicles including,
       (i) a leg pivotally connected to the pipe about an axis parallel to the pipe, and
       (ii) a foot on the bottom of the leg adapted to bear against the earth and support the pipe when the system is not being moved;
   (e) a trail tube pivoted to each movable support near the bottom thereof;
   (f) at least one connector connected to each trail tube and adapted to carry a sprinkler thereon; and
   (g) a fluid connection from the pipe to the trail tube so that water may be sprinkled onto the land both from the sprinklers on the pipe and sprinklers on the trail tubes.

2. In an agricultural irrigation system having
   (a) an elongated pipe adapted to carry water under pressure,
   (b) a plurality of risers on the pipe adapted to carry sprinklers for sprinkling water onto land to be watered, and
   (c) a plurality of vehicles attached to the pipe movably supporting the pipe above the ground, the improvement comprising:
   (d) a movable support between adjacent vehicles,
   (e) said support including a leg pivotally connected to the pipe about an axis parallel to the pipe below the pipe,
   (f) a foot attached to the bottom of the leg,
   (g) a trail tube pivoted to the foot,
   (h) said trail tube pivoted to the foot in front of the midpoint and said trail tube extending to the rear of the foot,
   (j) at least one connector connected to the trail tube and adapted to carry a sprinkler thereon, and
   (k) a fluid connection from the pipe to the trail tube so that water may be sprinkled onto the land both from sprinklers on the pipe and sprinklers on the trail tubes.

3. The invention as defined in claim 2 with the addition of:
(m) additional trail tubes attached to the pipe,
(n) one of said additional trail tubes attached to the pipe adjacent each vehicle,
(o) each of said additional trail tubes having a joint pivoted to pipe and pivoted to the trail tube so that the pipe as a whole or any individual vehicle may be reversed in direction of movement a short distance without moving the trail tubes.

4. In an agricultural sprinkler pipe moving system having
(a) an elongated pipe adapted to carry water under pressure,
(b) a plurality of risers on the pipe adapted to carry sprinklers for sprinkling water onto land to be watered, and
(c) a plurality of vehicles attached to the pipe movably supporting the pipe above the ground, the improved movable support between adjacent vehicles, comprising:
(d) a clamp attached to the pipe,
(e) a bracket connected to the clamp below the pipe,
(f) a leg pivoted to the bracket about an axis parallel to the pipe,
(g) a foot connected to the bottom of the leg,
(h) said foot having a skeleton constructed of pipe fittings,
(j) means on each end of the skeleton of the foot for attaching a trail tube to the skeleton, and
(k) a fluid connection from the pipe to the means for attaching so that water may be sprinkled onto the land from sprinklers on the pipe and sprinklers on trail tubes.

5. The invention as defined in claim 4 with the addition of
(m) a trail tube attached to the means on the front end of the foot, said trail tube extending to behind the foot.

6. The invention as defined in claim 4 wherein
(m) means on one end of the skeleton extends to one side of the foot and
(n) the means on the other end of the skeleton extends to the other side of the foot.

7. The invention as defined in claim 4 wherein the fluid connection from the pipe includes
(m) a flexible tube from the pipe to the top of the leg at the bracket,
(n) through the leg to the skeleton of the foot, and
(o) through the skeleton to the means on each end of the skeleton.

8. The invention as defined in claim 4 wherein
(m) said means on the skeleton are in the form of one half of a quick connection coupling.

References Cited by the Examiner

UNITED STATES PATENTS

| | | | |
|---|---|---|---|
| 2,174,600 | 10/1939 | Schutmaat | 137—344 XR |
| 2,892,466 | 6/1959 | Stillwell et al. | 137—344 |
| 3,166,088 | 1/1965 | Kern | 137—344 |

FOREIGN PATENTS

| | | |
|---|---|---|
| 246,424 | 8/1963 | Australia. |

M. CARY NELSON, *Primary Examiner.*

S. SCOTT, *Assistant Examiner.*